United States Patent
Xu

(10) Patent No.: US 11,284,223 B2
(45) Date of Patent: Mar. 22, 2022

(54) METHODS AND DEVICES FOR VERIFYING AND BROADCASTING EVENTS

(71) Applicant: Alipay (Hangzhou) Information Technology Co., Ltd., Zhejiang (CN)

(72) Inventor: Hui Xu, Zhejiang (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 17/130,806

(22) Filed: Dec. 22, 2020

(65) Prior Publication Data

US 2021/0281980 A1 Sep. 9, 2021

Related U.S. Application Data

(63) Continuation of application No. PCT/CN2020/078211, filed on Mar. 6, 2020.

(51) Int. Cl.
*H04W 4/06* (2009.01)
*G08G 1/09* (2006.01)
(Continued)

(52) U.S. Cl.
CPC ............. *H04W 4/06* (2013.01); *G08G 1/093* (2013.01); *H04L 9/0643* (2013.01);
(Continued)

(58) Field of Classification Search
CPC ............. H04L 2209/38; H04L 2209/84; H04L 9/0637; H04L 9/3297; H04L 9/321;
(Continued)

(56) References Cited

U.S. PATENT DOCUMENTS

| | | |
|---|---|---|
| 2014/0143004 A1 | 5/2014 | Abhyanker |
| 2018/0063238 A1* | 3/2018 | Zhang ................. G06F 11/1425 |
| 2019/0386995 A1 | 12/2019 | Chafe et al. |

FOREIGN PATENT DOCUMENTS

| | | |
|---|---|---|
| CN | 108449422 A | 8/2018 |
| CN | 110187369 A | 8/2019 |
| FR | 2709853 A1 | 3/1995 |

OTHER PUBLICATIONS

G. S. Praba Devi and J. C. Miraclin Joyce Pamila, "Accident Alert System Application Using a Privacy-Preserving Blockchain-Based Incentive Mechanism," 2019 5th International Conference on Advanced Computing & Communication Systems (ICACCS), Coimbatore, India, 2019, pp. 390-394, doi: 10.1109/ICACCS. (Year: 2019) 2019.8728507.*

(Continued)

*Primary Examiner* — Elton Williams
(74) *Attorney, Agent, or Firm* — Finnegan, Henderson, Farabow, Garrett & Dunner, LLP

(57) ABSTRACT

Disclosed herein are methods, devices, and apparatuses, including computer programs stored on computer-readable media, for verifying and broadcasting events. One of the methods includes: receiving a verification request from a reporting node, the verification request including a request to verify an occurrence of an event and a location of the event; identifying a set of verifying nodes based on the location of the event; requesting the verifying nodes to verify the occurrence of the event; determining whether a consensus to accept the occurrence of the event as true is reached by the verifying nodes; and in response to a determination that the consensus is reached by the verifying nodes, broadcasting the occurrence of the event to a set of receiving nodes.

18 Claims, 4 Drawing Sheets

(51) Int. Cl.
  *H04L 9/06* (2006.01)
  *H04L 9/32* (2006.01)
(52) U.S. Cl.
  CPC .......... *H04L 9/3239* (2013.01); *H04L 9/3297* (2013.01); *H04L 2209/38* (2013.01)
(58) Field of Classification Search
  CPC ................... H04L 67/12; H04L 63/00; G06K 2009/00738; G08G 1/0112; G08G 1/0175
  See application file for complete search history.

(56) References Cited

OTHER PUBLICATIONS

Chuka Oham, Raja Jurdak, Salil S. Kanhere, Ali Dorri, and Sanjay Jha; "B-FICA Blockchain based frame work for auto insurance claim and adjudication;" University of New South Wales, Sydney; CSIRO, data61; Jun. 16, 2018 pp. 1-10. (Year: 2018).*

International Search Report in Application No. PCT/CN2020/078211, from the National Intellectual Property Administration, PRC, dated Nov. 26, 2020.

Written Opinion of the International Search Authority in International Application No. PCT/CN2020/078211, dated Nov. 26, 2020.

* cited by examiner

METHODS AND DEVICES FOR VERIFYING AND BROADCASTING EVENTS

CROSS REFERENCE TO RELATED APPLICATIONS

This application is a continuation of International Application No. PCT/CN2020/078211, filed Mar. 6, 2020, the entire content of which is incorporated herein by reference.

TECHNICAL FIELD

The specification relates generally to computer technologies, and more particularly, to methods and devices for verifying and broadcasting events.

BACKGROUND

It is useful to broadcast information regarding traffic accidents to various users. Currently available broadcasting systems primarily rely on users to report such accidents. For example, a driver may call a local radio station to report an accident the user has observed, and the radio station may broadcast the report to other listeners in the area. Similarly, a user using a navigation application provided on a mobile phone may utilize the navigation application to report an accident. The navigation application may submit the report to a processing center, which may then make the report available to other users of the navigation application.

However, some users may forget to, or may be unable to, report certain accidents. Also, reporting may be delayed for various reasons. Furthermore, it may be difficult for the processing centers to verify the accuracy of the accidents reported.

SUMMARY

In one aspect, a computer-implemented method for verifying and broadcasting events includes: receiving a verification request from a reporting node, the verification request comprising a request to verify an occurrence of an event and a location of the event; identifying a set of verifying nodes based on the location of the event; requesting the verifying nodes to verify the occurrence of the event; determining whether a consensus to accept the occurrence of the event as true is reached by the verifying nodes; and in response to a determination that the consensus is reached by the verifying nodes, broadcasting the occurrence of the event to a set of receiving nodes.

In another aspect, a device for verifying and broadcasting events includes: one or more processors; and one or more computer-readable memories coupled to the one or more processors and having instructions stored thereon that are executable by the one or more processors to: receive a verification request from a reporting node, the verification request comprising a request to verify an occurrence of an event and a location of the event; identify a set of verifying nodes based on the location of the event; request the verifying nodes to verify the occurrence of the event; determine whether a consensus to accept the occurrence of the event as true is reached by the verifying nodes; and in response to a determination that the consensus is reached by the verifying nodes, broadcast the occurrence of the event to a set of receiving nodes.

In still another aspect, a non-transitory computer-readable medium has stored therein instructions that, when executed by a processor of a device, cause the device to perform a method for verifying and broadcasting events. The method includes: receiving a verification request from a reporting node, the verification request comprising a request to verify an occurrence of an event and a location of the event; identifying a set of verifying nodes based on the location of the event; requesting the verifying nodes to verify the occurrence of the event; determining whether a consensus to accept the occurrence of the event as true is reached by the verifying nodes; and in response to a determination that the consensus is reached by the verifying nodes, broadcasting the occurrence of the event to a set of receiving nodes.

BRIEF DESCRIPTION OF THE DRAWINGS

The accompanying drawings, which are incorporated in and constitute a part of this specification, illustrate embodiments. In the following description, which refers to the drawings, the same numbers in different drawings represent the same or similar elements unless otherwise represented.

DETAILED DESCRIPTION

Figure 1:
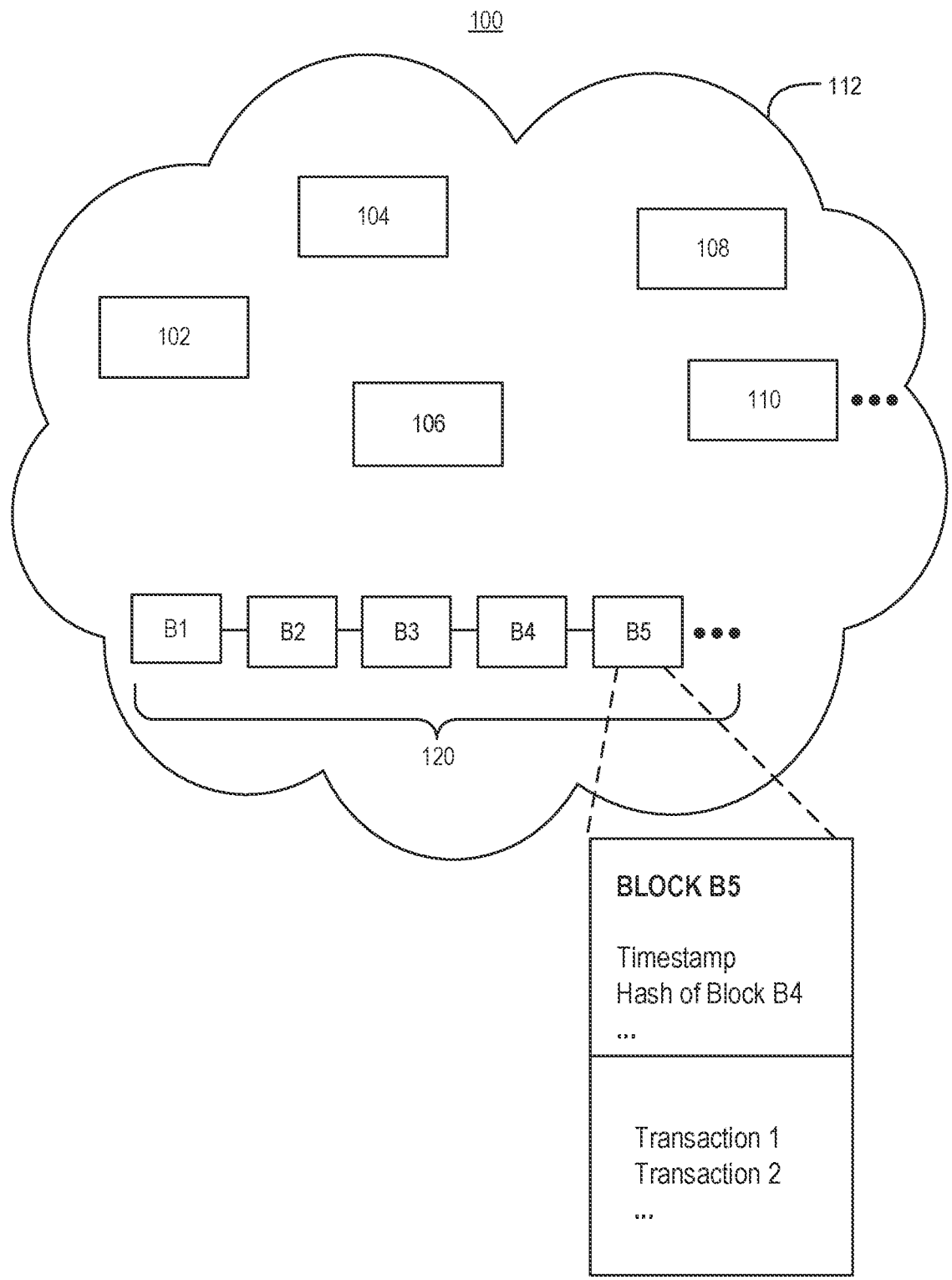
FIG. 1 is a schematic diagram of a blockchain system, according to an embodiment.

Embodiments of the specification provide methods and devices for verifying and broadcasting events. Events may include, e.g., traffic accidents, traffic jams, abnormal road conditions and the like. The methods and devices may trigger an automatic report of an event. The methods and devices may verify the occurrence of the event prior to broadcasting the event. The methods and devices may verify the occurrence of the event using a blockchain system that has nodes located near the location of the event. The methods and devices may implement a localized consensus protocol to allow the nodes located near the location of the event to determine whether a consensus can be reached regarding the occurrence of the event. The methods and devices may accept the consensus result, and if the consensus result indicates that the event has occurred, the methods and devices may broadcast the event.

Embodiments disclosed in the specification have one or more technical effects. In some embodiments, the methods and devices may trigger a report automatically upon detection of an event. This allows the methods and devices to operate with improved reliability. In some embodiments, the methods and devices may support verification of the occurrence of the event prior to broadcasting the event. This allows the methods and devices to operate with improved accuracy. In some embodiments, the methods and devices may verify the occurrence of the event using a blockchain system that has nodes located near the location of the event, and in some embodiments, the methods and devices may implement a localized consensus protocol to determine whether a consensus can be reached. This allows the methods and devices to localize and reduce computing resources needed to perform the verification. In some embodiments, the methods and devices may broadcast the event to various users after the occurrence of the event is verified. This allows the methods and devices to provide reliable and accurate information to various users who may use the information for various purposes, including, e.g., route planning, dispatching emergency services, managing traffic and road closures, or the like.

Blockchain systems, also known as distributed ledger systems (DLSs) or consensus systems, may enable participating parties to store data securely and immutably. Blockchain systems may include any DLSs, without referencing any particular use case, and may be used for public, private, and consortium blockchain networks. A public blockchain network is open for all entities to use the system and participate in the consensus process. A private blockchain network is provided for a particular entity, which centrally controls read and write permissions. A consortium blockchain network is provided for a select group of entities, which control the consensus process, and includes an access control layer.

A blockchain system is implemented using a peer-to-peer (P2P) network, in which the nodes communicate directly with each other, e.g., without the need of a fixed, central server. Each node in the P2P network may initiate communication with another node in the P2P network. A blockchain system maintains one or more blockchains.

A blockchain is a data structure that stores data, e.g., transactions, in a way that may prevent tampering and manipulation of the data by malicious parties. The transactions stored in this manner may be immutable and subsequently verified. A blockchain includes one or more blocks. Each block is linked to a previous block immediately before it in the blockchain by including a cryptographic hash of the previous block. Each block also may include a timestamp, its own cryptographic hash, and one or more transactions. The transactions, which generally have already been verified by the nodes of the blockchain system, may be hashed and encoded into a data structure, such as a Merkle tree. In a Merkle tree, data at leaf nodes of the tree is hashed, and all hashes in each branch of the tree may be concatenated at a root of the branch. This process continues up the tree to the root of the entire tree, which stores a hash that is representative of all data in the tree. A hash purporting to be of a transaction stored in the tree can be quickly verified by determining whether it is consistent with the structure of the tree.

A blockchain system includes a network of computing nodes that manage, update, and maintain one or more blockchains. The network may be a public blockchain network, a private blockchain network, or a consortium blockchain network. For example, numerous entities, such as hundreds, thousands, or even millions of entities, can operate in a public blockchain network, and each of the entities operates at least one node in the public blockchain network. Accordingly, the public blockchain network can be considered a public network with respect to the participating entities. Sometimes, a majority of entities (nodes) must sign every block for the block to be valid and added to the blockchain of the blockchain network. Examples of public blockchain networks include particular peer-to-peer payment networks that leverage a distributed ledger, referred to as blockchain.

In general, a public blockchain network may support public transactions. A public transaction is shared with all of the nodes in the public blockchain network, and is stored in a global blockchain. A global blockchain is a blockchain replicated across all nodes, and all nodes are in perfect state consensus with respect to the global blockchain. To achieve consensus (e.g., agreement to the addition of a block to a blockchain), a consensus protocol is implemented in the public blockchain network. Examples of consensus protocols include proof-of-work (POW) (e.g., implemented in the some crypto-currency networks), proof-of-stake (POS), and proof-of-authority (POA).

In general, a private blockchain network may be provided for a particular entity, which centrally controls read and write permissions. The entity controls which nodes are able to participate in the blockchain network. Consequently, private blockchain networks are generally referred to as permissioned networks that place restrictions on who is allowed to participate in the network, and on their level of participation (e.g., only in certain transactions). Various types of access control mechanisms can be used (e.g., existing participants vote on adding new entities, a regulatory authority can control admission).

In general, a consortium blockchain network may be private among the participating entities. In a consortium blockchain network, the consensus process is controlled by an authorized set of nodes, one or more nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network. Accordingly, the consortium blockchain network can be considered a private network with respect to the participating entities. In some examples, each entity (node) must sign every block in order for the block to be valid, and added to the blockchain. In some examples, at least a sub-set of entities (nodes) (e.g., at least 7 entities) must sign every block in order for the block to be valid, and added to the blockchain.

FIG. 1 illustrates a schematic diagram of a blockchain system 100, according to an embodiment. Referring to FIG. 1, the blockchain system 100 may include a plurality of nodes, e.g., nodes 102-110, configured to operate on a blockchain 120. The nodes 102-110 may form a network 112, such as a peer-to-peer (P2P) network. Each of the nodes 102-110 may be a computing device, such as a computer or a computer system, configured to store a copy of the blockchain 120, or may be software running on the computing device, such as a process or an application. Each of the nodes 102-110 may have a unique identifier.

The blockchain 120 may include a growing list of records in the form of data blocks, such as blocks B1-B5 in FIG. 1. Each of the blocks B1-B5 may include a timestamp, a cryptographic hash of a previous block, and data of the present block, which may be transactions such as monetary transactions. For example, as illustrated in FIG. 1, block B5 may include a timestamp, a cryptographic hash of block B4, and transaction data of block B5. Also, for example, a hashing operation may be performed on the previous block to generate the cryptographic hash of the previous block. The hashing operation may convert inputs of various lengths into cryptographic outputs of a fixed length through a hash algorithm, such as SHA-256.

The nodes 102-110 may be configured to perform an operation on the blockchain 120. For example, when a node, e.g., the node 102, wants to store new data onto the blockchain 120, that node may generate a new block to be added to the blockchain 120 and broadcast the new block to other nodes, e.g., the nodes 104-110, in the network 112. Based on legitimacy of the new block, e.g., validity of its signature and transactions, the other nodes may determine to accept the new block, such that the node 102 and the other nodes may add the new block to their respective copies of the blockchain 120. As this process repeats, more and more blocks of data may be added to the blockchain 120.

Figure 2:
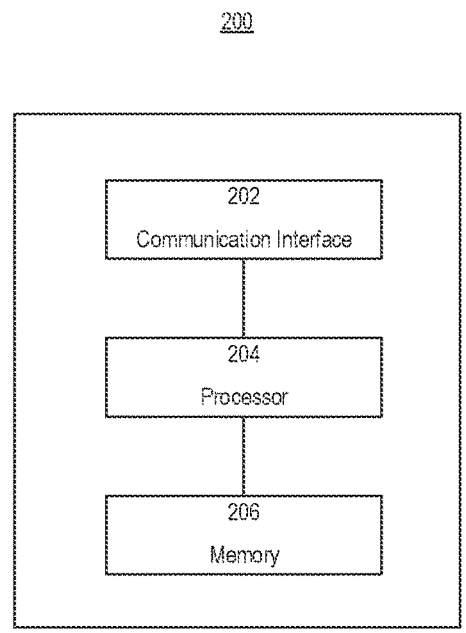
FIG. 2 is a schematic diagram of a computing device for implementing a node in a blockchain system, according to an embodiment.

FIG. 2 illustrates a schematic diagram of a computing device 200 for implementing a node, e.g., the node 102 (FIG. 1), in a blockchain system, according to an embodiment. Referring to FIG. 2, the computing device 200 may include a communication interface 202, a processor 204, and a memory 206.

The communication interface 202 may facilitate communications between the computing device 200 and devices implementing other nodes, e.g., nodes 104-110 (FIG. 1), in the network. In some embodiments, the communication interface 202 is configured to support one or more communication standards, such as an Internet standard or protocol, an Integrated Services Digital Network (ISDN) standard, etc. In some embodiments, the communication interface 202 may include one or more of a Local Area Network (LAN) card, a cable modem, a satellite modem, a data bus, a cable, a wireless communication channel, a radio-based communication channel, a cellular communication channel, an Internet Protocol (IP) based communication device, or other communication devices for wired and/or wireless communications. In some embodiments, the communication interface 202 may be based on public cloud infrastructure, private cloud infrastructure, hybrid public/private cloud infrastructure.

The processor 204 may include one or more dedicated processing units, application-specific integrated circuits (ASICs), field-programmable gate arrays (FPGAs), or various other types of processors or processing units. The processor 204 is coupled with the memory 206 and is configured to execute instructions stored in the memory 206.

The memory 206 may store processor-executable instructions and data, such as a copy of the blockchain 120 (FIG. 1). The memory 206 may include any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk. When the instructions in the memory 206 are executed by the processor 204, the computing device 200 may perform an operation on the blockchain 120.

Figure 3:
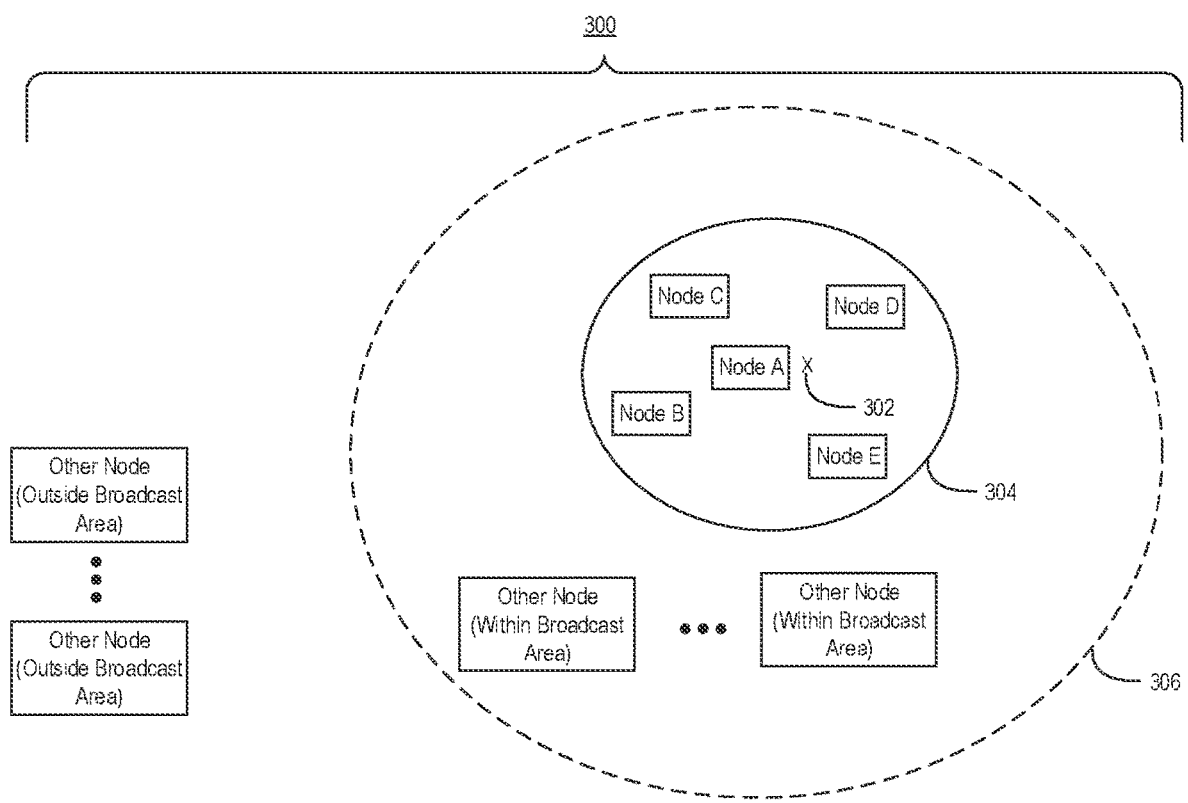
FIG. 3 is a schematic diagram of a blockchain system, according to an embodiment.

FIG. 3 illustrates a schematic diagram of a blockchain system 300 utilized to verify and broadcast the occurrence of an event, according to an embodiment. Referring to FIG. 3, the blockchain system 300 may include multiple nodes. The nodes may be operated by various users/entities, including, e.g., drivers, passengers, pedestrians, traffic controllers, emergency services providers, autonomous vehicles, and the like. For example, a driver may operate a dashboard recorder/camera that participates as a node in the blockchain system 300. Similarly, a passenger or a pedestrian may operate a mobile device, e.g., a cellular phone, that participates as a node in the blockchain system 300. In some embodiments, other devices, including, e.g., traffic cameras, security cameras, autonomous vehicles and the like, may also participate as nodes in the blockchain system 300.

For illustrative purposes, suppose that Node A (e.g., a dashboard recorder installed on a vehicle) detects or receives an input indicating an occurrence of an event. The event may occur at a location 302 and may include, e.g., a traffic accident, a traffic jam, an abnormal road condition, or the like. In some embodiments, Node A may be communicatively coupled with one or more sensors or image recognition devices capable of detecting the occurrence of the event. In some embodiments, the sensors or the image recognition devices may be capable of detecting the occurrence of the event when Node A is involved in the event. In some embodiments, the sensors or the image recognition devices may be capable of detecting the occurrence of the event even if Node A is not involved in the event. Alternatively, or additionally, Node A may support a manual submission of the occurrence of the event through a user interface, which may support keyboard commands, gesture commands, touch commands, voice commands, or the like.

In some embodiments, Node A may submit a verification request to the blockchain system 300 to request other nodes participating in the blockchain system 300 to verify the occurrence of the event. Node A may submit the verification request using various communication technologies, including, e.g., vehicle-to-everything (V2X) communication technologies as well as other wired or wireless communication technologies. In some embodiments, Node A may submit the verification request automatically when the event is detected. Alternatively, or additionally, Node A may support a manual submission of the verification request through the user interface.

In some embodiments, the verification request may include the coordinates, e.g., the latitude and longitude coordinates, of the location 302. In some embodiments, the verification request may also include a timestamp indicating when the event was Observed by Node A. In some embodiments, the verification request may further include information regarding the vehicle(s) involved in the event. Such information may include, e.g., vehicle identification numbers, license plate numbers, or the like. In some embodiments, the verification request may also include pictures of the event. In some embodiments, the pictures may be taken automatically by Node A. Alternatively, or additionally, Node A may submit pictures taken using other devices.

Upon receiving the verification request from Node A, the blockchain system 300 may identify a set of nodes 304 and request the identified set of nodes 304 to verify the occurrence of the event reported by Node A. For illustrative purposes, the set of nodes 304 may be referred to as a set of verifying nodes 304. In some embodiments, the blockchain system 300 may identify the set of verifying nodes 304 based on the location 302 of the event. For example, the blockchain system 300 may identify all available nodes currently located within a predetermined distance from the location 302 as verifying nodes 304. It is to be understood that the blockchain system 300 may utilize other techniques to identify verifying nodes 304.

In some embodiments, the blockchain system 300 may send a verification request to each verifying node identified in the set 304. For illustrative purposes, these verifying nodes are labeled as Nodes B through in FIG. 3. In some embodiments, the blockchain system 300 may allow certain verifying nodes to decline the verification request. For example, if Node E is a mobile device operated by a pedestrian several blocks away from the location 302, the blockchain system 300 may allow Node E to provide an option to the pedestrian, e.g., through a user interface, to accept or decline the verification request. If the pedestrian declines the verification request, the blockchain system 300 may exclude Node E from the set 304. In some embodiments, the blockchain system 300 may require participation of certain nodes in the set 304. For example, if Node C is a traffic camera, Node C may automatically accept the verification request sent by the blockchain system 300. For illustrative purposes, the following description may suppose that all nodes in the set 304 have accepted the verification request sent by the blockchain system 300.

Upon accepting the verification request, the verifying nodes, e.g., Nodes B through E, may jointly participate in a verification process. In some embodiments, the verification process may implement a localized consensus protocol. For example, in some embodiments, each verifying node may attempt to obtain one or more pictures of the location 302. Each verifying node may process the pictures obtained, e.g., using one or more image recognition techniques, to determine whether an event has indeed occurred at the location 302. In some embodiments, each verifying node may also take factors such as the coordinates, timestamps, as well as vehicle information into consideration. If a verifying node determines that an event has indeed occurred at the location 302, that verifying node may submit a confirmation transaction to the blockchain system 300 to confirm the occurrence of the event. In some embodiments, the verifying node may sign the confirmation transaction using its private key and submit the signed confirmation transaction to the blockchain system 300. Otherwise, if a verifying node disagrees with the report that an event has occurred at the location 302, that verifying node may refuse to submit a confirmation transaction, and in some embodiments, that verifying node may submit a refuting transaction instead to refute the occurrence of the event. In this manner, the blockchain system 300 may determine a number of confirmation transactions received, and if the number of confirmation transactions received exceeds a threshold value (e.g., a certain percentage of a total number of nodes in the set 304), the blockchain system 300 may deem that the verifying nodes have reached a consensus to accept the occurrence of the event reported by Node A as true. Otherwise, if no consensus is reached, the blockchain system 300 may refuse to accept the occurrence of the event reported by Node A as true.

Figure 4:
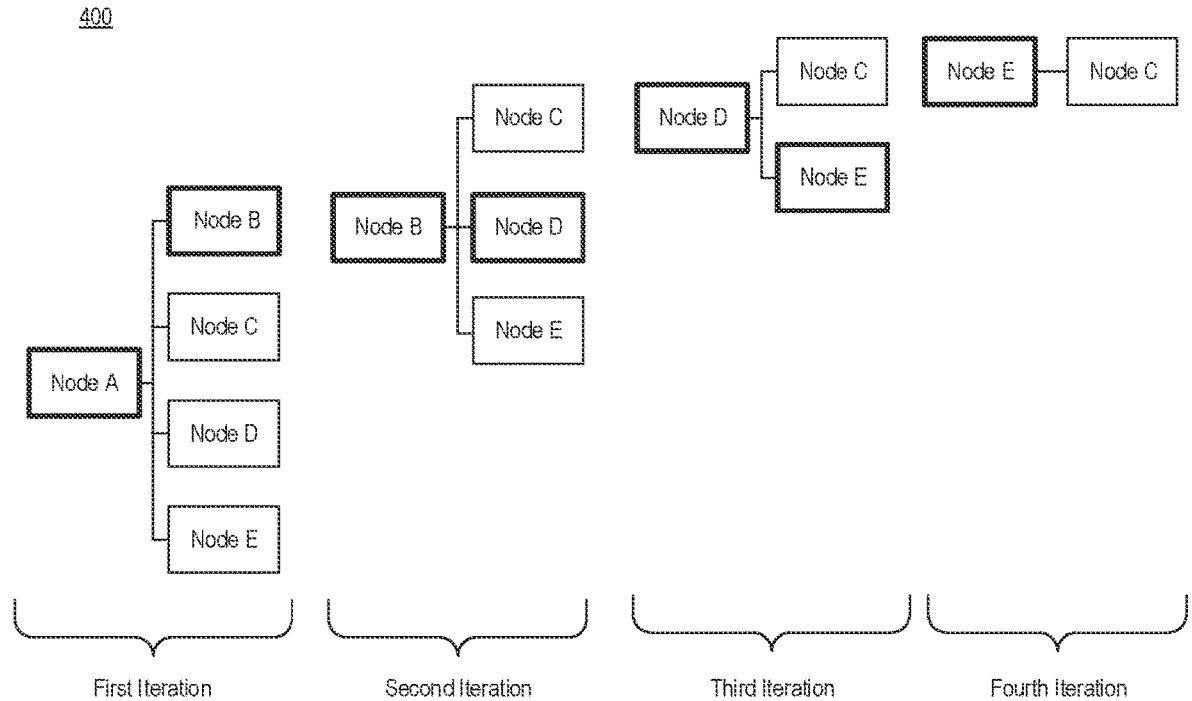
FIG. 4 is a schematic diagram of an iterative verification process, according to an embodiment.

In some embodiments, the blockchain system 300 may request the verifying nodes to perform the verification process in an iterative manner to further improve verification accuracy. FIG. 4 is a schematic diagram of an iterative verification process 400 performed according to an embodiment. As shown in the example depicted in FIG. 4, the first iteration may be carried out similar to that described above, where the verifying nodes, e.g., Nodes B through E, may each attempt to obtain one or more pictures of the location 302, process the pictures obtained to determine whether an event has indeed occurred at the location 302, and in response to a determination that an event has indeed occurred at the location 302, submit a signed confirmation transaction to the blockchain system 300 to confirm the occurrence of the event. However, when operating in the iterative verification process 400, only one confirmation transaction submitted by one of the verifying nodes may be accepted by the blockchain system 300 at the end of each iteration.

For example, in some embodiments, the blockchain system 300 may only accept the first confirmation transaction submitted. The blockchain system 300 may then request the verifying node that submitted the first confirmation transaction, e.g., Node B, to submit a second verification request to the blockchain system 300. The second verification request may request the remaining verifying nodes in the set 304, e.g., Nodes C through E, to verify the occurrence of the event again in a second iteration. Similarly, at the end of the second iteration, the blockchain system 300 may accept only one confirmation transaction submitted by one of the verifying nodes, e.g., Node D, and request Node D to submit a third verification request to the blockchain system 300. The third verification request may request the remaining nodes in the set 304, e.g., Nodes C and E, to verify the occurrence of the event again in a third iteration. In some embodiments, the iterative process 400 may terminate when there is no remaining node left in the set 304 (e.g., there will be no remaining node left in the set 304 after the fourth iteration depicted in FIG. 4). Alternatively, or additionally, the iterative process 400 may terminate when no confirmation transaction is received for a predetermined amount of time (e.g., 30 minutes or an hour). Upon termination of the iterative process 400, the blockchain system 300 may determine a number of confirmation transactions received, and if the number of confirmation transactions received exceeds a threshold value, the blockchain system 300 may deem that the verifying nodes have reached a consensus to accept the occurrence of the event reported by Node A as true. Otherwise, if no consensus is reached, the blockchain system 300 may refuse to accept the occurrence of the event reported by Node A as true.

Referring back to FIG. 3, in some embodiments, if the blockchain system 300 accepts the occurrence of the event reported by Node A as true, the blockchain system 300 may proceed to report the occurrence of the event to one or more public agencies, including, e.g., police departments, traffic controllers, emergency services, or the like. In some embodiments, the blockchain system 300 may also broadcast the report to other nodes participating in the blockchain system 300. In some embodiments, the blockchain system 300 may determine a broadcast area 306 prior to broadcasting the report to other nodes participating in the blockchain system 300. In this manner, the blockchain system 300 may localize the broadcast, making the broadcast more relevant to users' actual surroundings, further improving usability of the blockchain system 300.

In some embodiments, the blockchain system 300 may determine the broadcast area 306 based on the location 302. For example, the blockchain system 300 may identify all nodes currently located within a predetermined distance from the location 302 as the broadcast area 306. In some embodiments, the predetermined distance used to determine the broadcast area 306 may be greater than the predetermined distance used to identify the set of verifying nodes 304. It is to be understood that the blockchain system 300 may utilize other techniques to determine the broadcast area 306.

In some embodiments, the blockchain system 300 may send information regarding the event to each node located within the broadcast area 306. In some embodiments, the blockchain system 300 may send information regarding the event to nodes located within the broadcast area 306 that are setup to receive such information. The information may be utilized by various users for various purposes. Some users, e.g., drivers, navigation systems, driver assistance systems, or autonomous vehicles, may use the information for route planning purposes. Other users, e.g., first responders, may use the information to manage dispatch of emergency services. Still other users, e.g., traffic controllers, may use the information to manage traffic and road closures. In some embodiments, the blockchain system 300 may limit the broadcast to nodes located within the broadcast area 306. In this manner, nodes located outside of the broadcast area 306 do not need to be notified of the event happening at the location 302.

Figure 5:
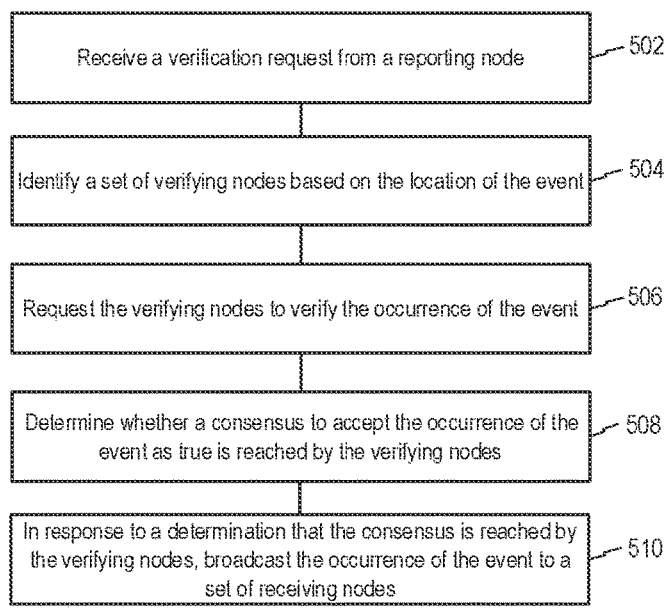
FIG. 5 is a flow chart of a method for verifying and broadcasting events, according to an embodiment.

FIG. 5 illustrates a flow chart of a method 500 for verifying and broadcasting events, according to an embodiment. The method 500 may be performed by one or more nodes in a blockchain system that maintains a blockchain, e.g., the nodes 102-110 in the blockchain system 100 (FIG. 1) or nodes in the blockchain system 300 (FIG. 3).

At step 502, the blockchain system may receive a verification request from a reporting node, e.g., Node A (FIG. 3). In some embodiments, the verification request may include a request to verify an occurrence of an event. The event may include, e.g., a traffic accident, a traffic jam, an abnormal road condition, or the like. In some embodiments, the verification request may also include a location of the event, a timestamp, vehicle information, and one or more pictures of the event.

At step 504, the blockchain system may identify a set of verifying nodes based on the location of the event. In some embodiments, the blockchain system may identify nodes within a first predetermined distance from the location of the event as the verifying nodes.

At step 506, the blockchain system may request the verifying nodes to verify the occurrence of the event. In some embodiments, the blockchain system may allow certain verifying nodes to decline the verification request. In such embodiments, the blockchain system may receive an indication indicating that a particular node has declined to be identified as a verifying node. The blockchain system may remove that particular node from the set of verifying nodes.

At step 508, the blockchain system may determine whether a consensus to accept the occurrence of the event as true is reached by the verifying nodes. In some embodiments, the blockchain system may determine a number of confirmation transactions received from the verifying nodes. In some embodiments, if the number of confirmation transactions received exceeds a threshold value, the blockchain system may deem that the consensus to accept the occurrence of the event as true is reached by the verifying nodes. In some embodiments, the blockchain system may determine whether the consensus is reached using an iterative process, such as the process 400 (FIG. 4). In such embodiments, the blockchain system may accept a first confirmation transaction submitted by a first verifying node and request the first verifying node to submit a second verification request to verify the occurrence of the event in a second iteration. In some embodiments, the iterative process may terminate when there is no remaining node left. Alternatively, or additionally, the iterative process may terminate when no confirmation transaction is received for a predetermined amount of time.

At step 510, the blockchain system may, in response to a determination that the consensus is reached by the verifying nodes, broadcast the occurrence of the event to a set of receiving nodes. In some embodiments, the blockchain system may identify nodes within a second predetermined distance from the location of the event as the receiving nodes. In some embodiments, the blockchain system may broadcast the occurrence of the event only to the set of receiving nodes. In this manner, nodes located outside of the set of receiving nodes do not need to be notified of the occurrence of event.

Figure 6:
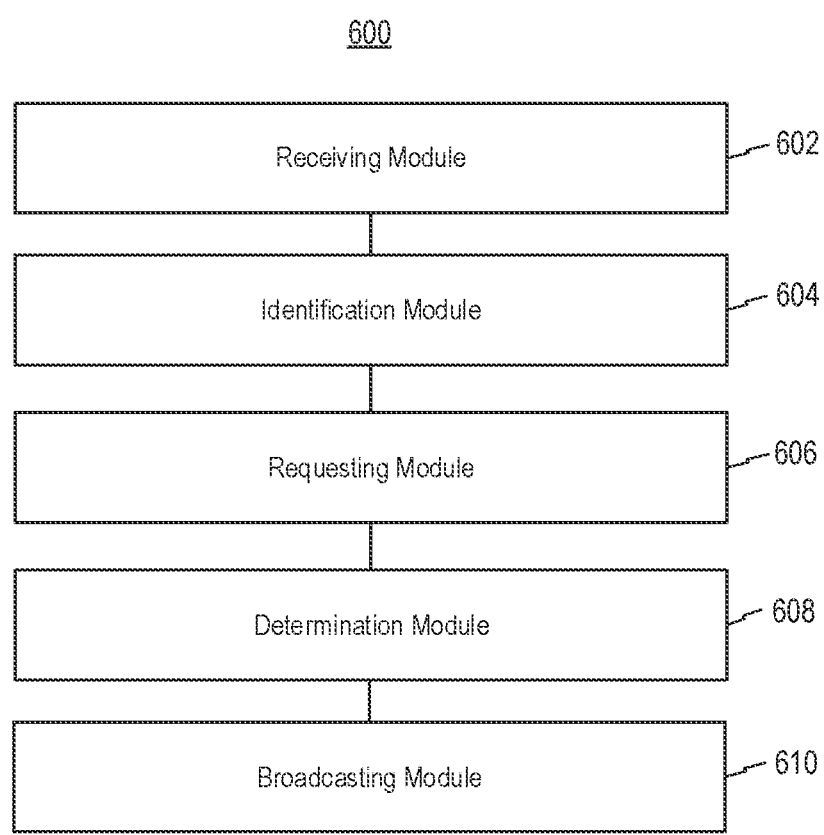
FIG. 6 is a block diagram of an apparatus for verifying and broadcasting events, according to an embodiment.

FIG. 6 is a block diagram of an apparatus 600 for verifying and broadcasting events, according to an embodiment. For example, the apparatus 600 may be an implementation of a software process and may correspond to the method 500 (FIG. 5). Referring to FIG. 6, the apparatus 600 may include a receiving module 602, an identification module 604, a requesting module 606, a determination module 608, and a broadcasting module 610.

The receiving module 602 may receive a verification request from a reporting node, e.g., Node A (FIG. 3). In some embodiments, the verification request may include a request to verify an occurrence of an event. The receiving module 602 may provide the verification request to the identification module 604.

The identification module 604 may identify a set of verifying nodes based on the location of the event. The identification module 604 may provide the set of verifying nodes to the requesting module 606.

The requesting module 606 may request the verifying nodes to verify the occurrence of the event. In some embodiments, the requesting module 606 may allow certain verifying nodes to decline the verification request. In some embodiments, the receiving module 602 may receive one or more confirmation transactions from the verifying nodes. The receiving module 602 may provide the confirmation transactions to the determination module 608.

The determination module 608 may determine whether a consensus to accept the occurrence of the event as true is reached by the verifying nodes. In some embodiments, the determination module 608 may determine a number of confirmation transactions received from the verifying nodes. In some embodiments, if the number of confirmation transactions received exceeds a threshold value, the determination module 608 may deem that the consensus to accept the occurrence of the event as true is reached by the verifying nodes. In some embodiments, the determination module 608 may determine whether the consensus is reached using an iterative process. In some embodiments, the determination module 608 may inform the broadcasting module 610 to broadcast the occurrence of the even when it is determined that the consensus is reached by the verifying nodes.

The broadcasting module 610 may broadcast the occurrence of the event to a set of receiving nodes. In some embodiments, the broadcasting module 610 may utilize the identifying module 604 to identify nodes within a second predetermined distance from the location of the event as the receiving nodes. In some embodiments, the broadcasting module 610 may broadcast the occurrence of the event only to the set of receiving nodes. In this manner, nodes located outside of the set of receiving nodes do not need to be notified of the occurrence of event.

Each of the above described modules may be implemented as software, or hardware, or a combination of software and hardware. For example, each of the above described modules may be implemented using a processor executing instructions stored in a memory. Also, for example, each the above described modules may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the described methods. Further for example, each of the above described modules may be implemented by using a computer chip or an entity, or implemented by using a product having a certain function. In one embodiment, the apparatus 600 may be a computer, and the computer may be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an implementation process of functions and roles of each module in the apparatus 600, references can be made to corresponding steps in the above-described methods. Details are omitted here for simplicity.

In some embodiments, a computer program product may include a non-transitory computer-readable storage medium having computer-readable program instructions thereon for causing a processor to carry out the above-described methods.

The computer-readable storage medium may be a tangible device that can store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

The computer-readable program instructions for carrying out the above-described methods may be assembler instructions, instruction-set-architecture (ISA) instructions, machine instructions, machine dependent instructions, microcode, firmware instructions, state-setting data, or source code or object code written in any combination of one or more programming languages, including an object oriented programming language, and conventional procedural programming languages. The computer-readable program instructions may execute entirely on a computing device as a stand-alone software package, or partly on a first computing device and partly on a second computing device remote from the first computing device. In the latter scenario, the second, remote computing device may be connected to the first computing device through any type of network, including a local area network (LAN) or a wide area network (WAN).

The computer-readable program instructions may be provided to a processor of a general-purpose or special-purpose computer, or other programmable data processing apparatus to produce a machine, such that the instructions, which execute via the processor of the computer or other programmable data processing apparatus, create means for implementing the above-described methods.

The flow charts and diagrams in the figures illustrate the architecture, functionality, and operation of possible implementations of devices, methods, and computer program products according to various embodiments of the specification. In this regard, a block in the flow charts or diagrams may represent a software program, segment, or portion of code, which comprises one or more executable instructions for implementing specific functions. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the diagrams and/or flow charts, and combinations of blocks in the diagrams and flow charts, may be implemented by special purpose hardware-based systems that perform the specified functions or acts, or combinations of special purpose hardware and computer instructions.

It is appreciated that certain features of the specification, which are, for clarity, described in the context of separate embodiments, may also be provided in combination in a single embodiment. Conversely, various features of the specification, which are, for brevity, described in the context of a single embodiment, may also be provided separately or in any suitable subcombination or as suitable in any other described embodiment of the specification. Certain features described in the context of various embodiments are not essential features of those embodiments, unless noted as such.

Although the specification has been described in conjunction with specific embodiments, many alternatives, modifications and variations will be apparent to those skilled in the art. Accordingly, the following claims embrace all such alternatives, modifications and variations that fall within the terms of the claims.

The invention claimed is:

1. A computer-implemented method for verifying and broadcasting events, the method comprising:
   receiving a verification request from a reporting node, the verification request comprising a request to verify an occurrence of an event and a location of the event;
   identifying a set of verifying nodes located within a first predetermined distance from the location of the event;
   requesting the verifying nodes to verify the occurrence of the event;
   determining whether a consensus to accept the occurrence of the event as true is reached by the verifying nodes, the consensus being determined in accordance with a localized consensus protocol implemented in a blockchain system that determines whether the consensus is reached based on confirmation transactions submitted by the verifying nodes; and
   in response to a determination that the consensus is reached by the verifying nodes, broadcasting the occurrence of the event to a set of receiving nodes.

2. The method of claim 1, wherein the reporting node, the set of verifying nodes, and the set of receiving nodes are nodes in the blockchain system.

3. The method of claim 1, further comprising:
   receiving an indication indicating that a particular node declines to be identified as a verifying node; and
   removing the particular node from the set of verifying nodes.

4. The method of claim 1, wherein the determining whether the consensus is reached further comprises:
   determining a number of confirmation transactions received from the verifying nodes; and
   in response to a determination that the number of confirmation transactions received exceeds a threshold value, reporting that the consensus to accept the occurrence of the event as true is reached by the verifying nodes.

5. The method of claim 1, wherein the determining whether the consensus is reached further comprises:
   accepting a first confirmation transaction submitted by a first verifying node of the set of verifying nodes in a first iteration; and
   requesting the first verifying node to submit a second verification request to verify the occurrence of the event in a second iteration.

6. The method of claim 5, further comprising:
   terminating the second iteration when no confirmation transaction is received for a predetermined amount of time.

7. The method of claim 1, further comprising:
identifying nodes within a second predetermined distance from the location of the event as the set of receiving nodes.

8. The method of claim 1, wherein the broadcasting the occurrence of the event to a set of receiving nodes further comprises:
broadcasting the occurrence of the event only to the set of receiving nodes.

9. The method of claim 1, wherein the event comprises a traffic accident and the verification request further comprises at least one of a timestamp and one or more pictures of the traffic accident.

10. A device for verifying and broadcasting events, comprising:
one or more processors; and
one or more computer-readable memories coupled to the one or more processors and having instructions stored thereon that are executable by the one or more processors,
wherein the one or more processors are configured to:
receive a verification request from a reporting node, the verification request comprising a request to verify an occurrence of an event and a location of the event;
identify a set of verifying nodes located within a first predetermined distance from the location of the event;
request the verifying nodes to verify the occurrence of the event;
determine whether a consensus to accept the occurrence of the event as true is reached by the verifying nodes, the consensus being determined in accordance with a localized consensus protocol implemented in a blockchain system that determines whether the consensus is reached based on confirmation transactions submitted by the verifying nodes; and
in response to a determination that the consensus is reached by the verifying nodes, broadcast the occurrence of the event to a set of receiving nodes.

11. A non-transitory computer-readable medium having stored therein instructions that, when executed by a processor of a device, cause the device to perform a method for verifying and broadcasting events, the method comprising:
receiving a verification request from a reporting node, the verification request comprising a request to verify an occurrence of an event and a location of the event;
identifying a set of verifying nodes located within a first predetermined distance from the location of the event;
requesting the verifying nodes to verify the occurrence of the event;
determining whether a consensus to accept the occurrence of the event as true is reached by the verifying nodes, the consensus being determined in accordance with a localized consensus protocol implemented in a blockchain system that determines whether the consensus is reached based on confirmation transactions submitted by the verifying nodes; and
in response to a determination that the consensus is reached by the verifying nodes, broadcasting the occurrence of the event to a set of receiving nodes.

12. The device of claim 10, wherein the reporting node, the set of verifying nodes, and the set of receiving nodes are nodes in the blockchain system.

13. The device of claim 10, wherein the one or more processors are further configured to:
receive an indication indicating that a particular node declines to be identified as a verifying node; and
remove the particular node from the set of verifying nodes.

14. The device of claim 10, wherein in determining whether the consensus is reached, the one or more processors are further configured to:
determine a number of confirmation transactions received from the verifying nodes; and
in response to a determination that the number of confirmation transactions received exceeds a threshold value, report that the consensus to accept the occurrence of the event as true is reached by the verifying nodes.

15. The device of claim 10, wherein in determining whether the consensus is reached, the one or more processors are further configured to:
accept a first confirmation transaction submitted by a first verifying node of the set of verifying nodes in a first iteration; and
request the first verifying node to submit a second verification request to verify the occurrence of the event in a second iteration.

16. The device of claim 15, wherein the one or more processors are further configured to:
terminate the second iteration when no confirmation transaction is received for a predetermined amount of time.

17. The device of claim 11, wherein the one or more processors are further configured to:
identify nodes within a second predetermined distance from the location of the event as the set of receiving nodes.

18. The device of claim 10, wherein in broadcasting the occurrence of the event to a set of receiving nodes, the one or more processors are further configured to:
broadcast the occurrence of the event only to the set of receiving nodes.

* * * * *